United States Patent
Gnielka

(10) Patent No.: US 11,148,603 B2
(45) Date of Patent: Oct. 19, 2021

(54) HOUSING FOR A STORAGE COMPARTMENT, FIXING SYSTEM, AND METHOD FOR PRODUCING A HOUSING FOR A STORAGE COMPARTMENT

(71) Applicant: Volkswagen Aktiengesellschaft, Wolfsburg (DE)

(72) Inventor: Eckart Gnielka, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 75 days.

(21) Appl. No.: 16/786,468

(22) Filed: Feb. 10, 2020

(65) Prior Publication Data

US 2020/0180514 A1 Jun. 11, 2020

Related U.S. Application Data

(63) Continuation of application No. PCT/EP2018/066541, filed on Jun. 21, 2018.

(30) Foreign Application Priority Data

Aug. 9, 2017 (DE) .................... 10 2017 213 857.2

(51) Int. Cl.
*B60R 7/06* (2006.01)
*E05B 83/30* (2014.01)

(52) U.S. Cl.
CPC .............. *B60R 7/06* (2013.01); *E05B 83/30* (2013.01); *E05Y 2900/538* (2013.01)

(58) Field of Classification Search
CPC ...... B60R 7/06; E05B 83/30; E05Y 2900/538
USPC ..................................................... 296/37.12
See application file for complete search history.

(56) References Cited

U.S. PATENT DOCUMENTS

| | | | | |
|---|---|---|---|---|
| 4,239,277 A | * | 12/1980 | Oda | ......................... B60R 7/06 180/90 |
| 4,995,680 A | * | 2/1991 | Miruri | ................. B60R 11/0205 312/7.1 |
| 5,184,489 A | * | 2/1993 | Squires | ............... B60R 11/0205 296/37.12 |

(Continued)

FOREIGN PATENT DOCUMENTS

| CN | 105507719 A | 4/2016 |
|---|---|---|
| DE | 43 23 095 C1 | 10/1994 |

(Continued)

OTHER PUBLICATIONS

Third Party Observation for application No. EP20180734783 dated Jan. 7, 2021.

(Continued)

*Primary Examiner* — Pinel E Romain
(74) *Attorney, Agent, or Firm* — Muncy, Geissler, Olds & Lowe, P.C.

(57) ABSTRACT

A housing for a storage compartment of a vehicle, comprising a wall having a first surface region, which at least partly forms a first side of the wall, and a fixing opening which adjoins the first surface region, wherein a guide for guiding an opening and/or closing movement of a door of the storage compartment can be disposed in the fixing opening. The invention further relates to a fixing system for at least partially fixing a door of a storage compartment of a vehicle, and to a method for producing a housing for a storage compartment of a vehicle.

10 Claims, 5 Drawing Sheets

(56) References Cited

U.S. PATENT DOCUMENTS

| | | | |
|---|---|---|---|
| 5,460,248 A | 10/1995 | Korb et al. | |
| 5,460,309 A * | 10/1995 | Nehl | B60R 7/082 |
| | | | 224/281 |
| 5,520,313 A | 5/1996 | Toshihide | |
| 6,131,242 A | 10/2000 | Zipperle et al. | |
| 7,044,529 B2 | 5/2006 | Svenson et al. | |
| 7,185,927 B2 * | 3/2007 | Talukdar | E05B 83/30 |
| | | | 292/124 |
| 7,374,220 B2 * | 5/2008 | Ichimaru | B60R 7/06 |
| | | | 296/24.34 |
| 8,459,603 B2 * | 6/2013 | Baudisch | B60K 35/00 |
| | | | 248/292.14 |
| 9,090,208 B2 * | 7/2015 | Marchetti | B60R 13/0256 |
| 9,216,696 B2 * | 12/2015 | Zhong | B60R 7/06 |
| 10,131,283 B2 | 11/2018 | Roychoudhury | |
| 2002/0101091 A1 * | 8/2002 | Ito | B60R 11/0264 |
| | | | 296/37.12 |
| 2005/0133523 A1 | 6/2005 | Kim | |
| 2005/0156433 A1 * | 7/2005 | Nemoto | E05B 83/30 |
| | | | 292/163 |
| 2007/0187195 A1 | 8/2007 | Park | |
| 2008/0093401 A1 | 4/2008 | Hanson et al. | |
| 2012/0175204 A1 * | 7/2012 | Arnold | E05F 5/00 |
| | | | 188/271 |
| 2014/0175824 A1 * | 6/2014 | Park | B60R 7/06 |
| | | | 296/37.12 |
| 2015/0360616 A1 * | 12/2015 | Shami | B60R 7/06 |
| | | | 296/37.8 |
| 2016/0069412 A1 | 3/2016 | Jeon et al. | |
| 2019/0003215 A1 * | 1/2019 | Stoia | E05B 81/56 |
| 2020/0002978 A1 * | 1/2020 | Ketels | B60K 37/06 |
| 2020/0131813 A1 * | 4/2020 | Wiepen | E05B 83/30 |
| 2020/0263469 A1 * | 8/2020 | Tyler | F16F 15/123 |
| 2020/0331402 A1 * | 10/2020 | Park | E05D 15/582 |

FOREIGN PATENT DOCUMENTS

| | | |
|---|---|---|
| DE | 197 29 900 C1 | 10/1998 |
| DE | 199 21 208 C1 | 8/2000 |
| DE | 10116045 A1 | 10/2002 |
| DE | 103 41 969 A1 | 4/2005 |
| DE | 10 2009 042 053 A1 | 3/2011 |
| DE | 10 2006 056 125 B4 | 4/2013 |
| DE | 202015105986 U1 | 12/2015 |
| DE | 20 2015 105 988 U1 | 4/2016 |
| DE | 20 2017 105 704 U1 | 11/2017 |
| WO | WO-2018181905 A1 * | 10/2018 ............ F16F 7/085 |

OTHER PUBLICATIONS

Baur et al: "Saechtling Kunststoff Taschenbuch", 30 Edition, 2007, pp. 413 and 416, Carl Hanser Verlag, ISBN: 978-3-446-40352-9, XP055771358.

Thomas Brinkmann: "Handbuch Produktentwicklung mit Kunststoffen", 2010, pp. 248-258, Carl Hanser Verlag, ISBN: 978-3-446-42243-8, XP055771364.

Gunter Erhard: "Konstruieren mit Kunststoffen", 1993, pp. 166-168, Carl Hanser Verlag, ISBN: 3-446-17397-8, XP055771368.

S. Gueney: "Die Kosten im Blick" Sep. 28, 2006.

Torsten Kies: "10 Grundregeln zur Konstruktion von Kunststoffprodukten", 2014, pp. 107-111, Carl Hanser Verlag, ISBN: 978-3-446-44230-6, XP055771388.

* cited by examiner

HOUSING FOR A STORAGE COMPARTMENT, FIXING SYSTEM, AND METHOD FOR PRODUCING A HOUSING FOR A STORAGE COMPARTMENT

This nonprovisional application is a continuation of International Application No. PCT/EP2018/066541, which was filed on Jun. 21, 2018, and which claims priority to German Patent Application No. 10 2017 213 857.2, which was filed in Germany on Aug. 9, 2017, and which are both herein incorporated by reference.

BACKGROUND OF THE INVENTION

Field of the Invention

The present invention relates to a housing for a storage compartment of a vehicle, a fixing system for at least partially fixing a door of a storage compartment of a vehicle, and a method for producing a housing for a storage compartment of a vehicle.

Description of the Background Art

It is known that storage compartments in vehicles are often provided with a door which is used to open and close the storage compartment. Thus, e.g., glove compartments of vehicles are usually located above a free space for the legs of a passenger. The door for opening and closing the glove box is pivotally mounted on a housing so that the passenger can also comfortably reach into the glove box. In order to influence the pivoting movement, a guide is also often provided which guides the glove compartment door during the opening and closing movement. A guide of this kind is known, for example, from DE 10 2009 042 053 B1, which corresponds to US 2012/0175204. Such guides are often attached to the door, on the one hand, and to a housing of the glove compartment, on the other hand, for which purpose the housing has a bore or the like. Because such housings are often made as injection molded parts, which are demolded in the direction of the storage compartment, the fixing opening often has to be made subsequently in the housing. This requires a further processing step, however, which has to be carried out after the injection molding and which can comprise, for example, drilling and/or milling. Alternatively, it is known to provide a slide which introduces the fixing opening into the housing during the injection molding process. However, the slide has disadvantages in terms of tooling, such as, for example, an increased space required in the mold, and it increases the costs of the injection mold for the housing.

SUMMARY OF THE INVENTION

It is therefore an object of the present invention to overcome at least partially the previous disadvantages known from the prior art. In particular, it is an object of the present invention to improve a housing for a storage compartment with regard to the production and/or the guiding properties for the door of the storage compartment.

Further features and details of the invention emerge from the dependent claims, the description, and the drawings. In this respect, features and details that are described in relation to the housing of the invention also apply, of course, in relation to the fixing system of the invention and/or the method of the invention, and conversely in each case, so that with regard to the disclosure, reference is or can always be made mutually to the individual aspects of the invention.

According to an exemplary embodiment of the invention, the housing for a storage compartment of a vehicle has a wall having a first surface region. The first surface region at least partly forms a first side of the wall. Further, the wall has a fixing opening which adjoins the first surface region. A guide for guiding an opening and/or closing movement of a storage compartment door can be disposed in the fixing opening. Further, the fixing opening has a lateral surface which at least partially projects beyond the first surface region, in particular toward the first side.

The storage compartment can be a glove compartment of a vehicle. The housing can preferably be part of an instrument panel of a vehicle. The at least partial projection of the lateral surface beyond the first surface region creates an offset area at the opening, in which preferably two molding elements of a mold can contact one another, so that the fixing opening is created when the housing is cast. The first surface region can preferably form in part the first side, in particular a part of the surface of the first side. In this respect, for example, a further surface region can form a further part of the first side. The first and the further surface region can in particular be separated by a step or merge into one another continuously, e.g., by a slope. In particular, the lateral surface thus projects beyond the first surface region such that demolding is possible in the production of the housing in which the fixing opening is created. The fact that the lateral surface can at least partially project from the first surface region can thus be understood to mean that the lateral surface is at least partially in relation to the first side. The lateral surface can be understood to mean the inner surface of the fixing opening, i.e., in particular the surface which the guide abuts when it is mounted in the fixing opening. The lateral surface can advantageously be formed by a region of the wall, in particular by an end face of the wall. The lateral surface is thus preferably oriented at least partially perpendicular to a radius of the passage of the fixing opening. In particular, the lateral surface forms an edge of the fixing opening. In this respect, in particular, a first edge side is raised relative to a second edge side. Further, it is conceivable for the edge of the fixing opening to be designed in a stepped manner, wherein the first edge side, which is raised in relation to the first surface region, preferably lies opposite the second edge side. The lateral surface can preferably be perpendicular or substantially perpendicular to the first surface region. Further, a wall thickness of the wall at the edge of the fixing opening can be constant or substantially constant. The housing, in particular the wall, can preferably comprise a plastic or consist of a plastic. In particular, the wall is made as an injection-molded plastic part. The first side of the wall can preferably be an outer side of the wall. The outer side can in particular be understood to mean a side of the wall which faces away from the storage compartment. The first surface region can thus form part of the surface of the first side. In particular, the first surface region adjoins the fixing opening on the first edge side, whereas the second edge side of the fixing opening projects beyond the first surface region. As a result, demolding can be carried out along the first surface region during the production of the housing.

The fixing opening can thus be produced when casting the housing or when demolding the housing, without the need for an additional slide for producing the fixing opening. At the same time, guiding of the door can be ensured by the fixing opening in that the guiding means is mountable in the fixing opening. This can reduce production costs and simplify the production process.

In a housing of the invention, it can preferably be provided that a second surface region of a second side of the wall adjoins the fixing opening, wherein the second surface region lies at least substantially in one plane with the first surface region or is raised in relation to the first surface region in the direction of the first side. In particular, the lateral surface can simultaneously project beyond the second surface region, as a result of which the offset is formed in particular. The second side of the wall can preferably lie opposite the first side and thus face the storage compartment. In particular, the second side is therefore an inner side of the wall. The second surface region thus preferably adjoins the fixing opening on the second edge side of the fixing opening. The fact that the second surface region lies at least substantially in one plane with the first surface region can be understood such that the opposite edge sides of the fixing opening can also overlap such that a forced demolding is possible. Thus, a molding element can also project at least partially into the fixing opening during demolding and can be pulled out during demolding. Preferably, however, the second surface region can also lie completely in one plane with the first surface region. In particular, the first and second surface regions can only lie in one plane in an edge region of the fixing opening, in particular if the surface regions are formed obliquely to one another. As a result, forced demolding is not necessary and at the same time the offset of the edge sides of the fixing opening can be minimal. Tool costs of the mold can thus be reduced, for example. Further, the second surface region can be raised in relation to the first surface region in the direction of the first side, so that demolding of the part can be further simplified. The first and second surface regions can thus each be provided, for example, as draft angles in order to further simplify demolding of the housing. In particular, this can result in an offset in which the second, raised edge side of the fixing opening is completely offset from the first edge side.

In the case of a housing, it is conceivable further that the lateral surface for the rotational guiding of the guide is formed at least partially cylindrical. In this respect, the fixing opening can preferably have a mounting cutout, through which at least one first projection of a rotary element of the guide, in particular for mounting the guide, can be inserted. At least the first and second edge side are preferably made cylindrical. On the one hand, this can provide secure guiding of a rotary element of the guide in the fixing opening. On the other hand, a mold can thereby be designed in a simple manner, because such a curvature can be milled, for example, in a simple manner as a negative form. The mounting cutout can thus represent an interruption in the cylinder-like shape and, e.g., extend in a rectangular shape from the center of the fixing opening into the wall. The first projection can preferably be disposed on a rotary element of the guide, which can be inserted through the fixing opening from the second side to the first side. A part of a bayonet-type closure can thus be formed by the first projection.

A fixing system for at least partially fixing a door of a storage compartment of a vehicle is claimed according to a further aspect of the invention. The fixing system here has a guide for guiding an opening and/or closing movement of the door. Further, the fixing system has a housing with a wall which has a fixing opening. The guide is disposed in the fixing opening. Further, the housing is designed according to a housing of the invention.

Thus, the fixing system of the invention provides the same advantages as have been described in detail with reference to a housing of the invention. In particular, this ensures an at least partial fixing of the door to the housing. Fixing can be understood to mean, in particular, the creation of a guiding effect and/or a limitation of the opening movement for the door on the housing during the opening movement of the door. The simplified production of the housing thus results in an overall simplified production of the fixing system, wherein the guide can be adapted accordingly to the circumstances of the fixing opening.

In the case of a fixing system of the invention, it is conceivable further that the guide comprises a rotary element which projects through the fixing opening. As a result, a part, in particular the larger part, of the rotary element can extend to the first side, so that the thus created installation space on the second side can be used for other purposes. In particular, the distance between the wall and the compartment can be reduced thereby. In particular, a rail element by which the door can be coupled in a translational and/or rotary manner can be guided in the rotary element. The rotary element thus preferably serves as a slide bearing in the fixing opening. For this purpose, the rotary element can preferably comprise a plastic or consist of plastic. The rotary element can preferably be designed like a cylinder, in particular wherein a surface is machined with regard to its friction properties. Thus, for example, the rotary element can be at least locally polished or have a coating which has good friction properties, in particular with the wall of the housing. Preferably, an axis of rotation of the rotary element can be aligned parallel to a hinge axis of the door. The axis of rotation of the rotary element can thus in particular be oriented at least substantially perpendicular to the wall or to the first and/or second surface region of the wall. In particular, the door can be mounted on a hinge, in particular of the housing, and can preferably be additionally guided by the guide. This enables a pivoting movement of the door, which enables a stable opening movement of the door as play-free as possible. The rail element can thus enable a connection of the rotary element and door and at the same time preferably move relative to the rotary element. For this purpose, the rail element can be formed U-shaped at least in sections in order to ensure secure guidance in the rotary element.

In addition or alternatively, the rail element can advantageously have a double T-shaped cross section or a rectangular cross section at least in sections. The pivoting movement of the door can thus be realized overall in that, firstly, the rail element moves relative to the rotary element and thus enables an opening path of the door and at the same time the rotary element rotates in the fixing opening in order to enable the pivoting movement of the door and the rail element. Alternatively, however, it is also conceivable that the rail element is mounted on the door such that rotation of the rotary element is not necessary and the rotary element is rotated, for example, for mounting by means of a bayonet lock, only during the mounting of the fixing opening.

It is further conceivable that in a fixing system of the invention, the rotary element has a first and a second projection, wherein the first and second projection for mounting the rotary element on the wall can be inserted through a mounting cutout of the fixing opening, in particular so that the first and second projection abut the first side of the wall in the mounted state. Thus, the rotary element can preferably be inserted through the fixing opening from the second to the first side, in order to be brought into the mounted state when the rotary element rotates, and to be fixed in a positive manner by means of the projections in the manner of a bayonet lock. A positive fit with the wall is thus preferably formed by the first and second projection of the rotary element when it is rotated into the mounted state. In particular, in this regard, a twist angle for mounting is greater than a twist angle during a rotary guiding of the door by the rotary element. The first and second projection can preferably lie opposite one another or the first projection can have an angle of approximately 180° to the second projection. The pivoting movement of the door in particular only causes a slight angular displacement, so that there is no risk of the projections falling out of the mounting cutouts during operation. The production of the fixing system can thus be further simplified by the first and second projections and the positive fit, because the housing can be used in particular without tools and the rotary element can be mounted on the wall by means of a simple plug-in or bayonet principle. Thus, preferably no further tool may be necessary to mount the guide on the housing. The first and/or second projection are preferably formed integrally with the rotary element. This can further simplify the production and handling for mounting the rotary element.

In the context of the invention it can further be provided that the rotary element has a third and a fourth projection, wherein the third and fourth projection abut a second side of the wall. The second side is preferably the side opposite the first side. In particular, the third and/or fourth projection can be formed integrally with the rotary element. The third and fourth projections can thus improve the positive fit of the first and second projection. Thus, the third and fourth projection, for example, reduces the risk of the rotary element tipping over in the fixing opening. As a result, for example, tolerances of the fixing opening and/or of the rotary element can be increased, which in turn can have a positive effect on the production costs of the housing and/or of the rotary element. At the same time, the third and fourth projections can ensure secure guidance and little play between the parts. The third projection can preferably be associated with the first projection and the fourth projection with the second projection, so that two projections each enclose part of the wall, in particular an edge side of the fixing opening. In particular, two projections in each case can thus at least substantially lie opposite one another.

It is also conceivable in a fixing system of the invention that the guide has a damper element by means of which a relative movement of the rail element to the rotary element can be damped and/or that the guide has a drive element by means of which a relative movement of the rail element to the rotary element can be initiated. The damper element can improve the guiding of the door, so that the door does not fall down unchecked during the opening movement of the door, particularly towards the vehicle occupants, but instead opens damped and slowly. Thus, the opening movement as such can be improved by the damper element, and at the same time, the accommodation of the damper element in the guide offers a simple possibility of producing the fixing system, because, for example, the guide can be premounted and then mounted on the wall of the housing by means of a bayonet lock without the possible need for additional damper elements on the housing as well.

The drive element can, for example, automatically open the door by means of a switch, so that manual opening of the storage compartment is not necessary and the user's convenience can be increased. The accommodation of the drive element in the guide can thus preferably also simplify the mounting of the fixing system in that the guide can be premounted as a separate structural unit before it is mounted on the wall of the housing. The drive element further can be designed pneumatically, hydraulically, and/or electrically. Thus it is conceivable, for example, that a pneumatic cylinder is guided on the rail element or that the drive element is designed as an electric motor.

The damper element further can be designed pneumatically and/or hydraulically and/or mechanically and/or as an eddy current brake and/or comprise a viscous damper. In particular, the damper element can comprise a pneumatic cylinder which is disposed on the rail element and dampens the relative movement of the rail element to the rotary element. In addition or alternatively, the damper element and/or the rail element can have a stop for the rotary element. The stop can comprise, for example, a wedge, which can limit the movement of the door and/or can be designed as a friction brake. Further, the damper element can interact with a toothed region of the rail element, wherein, for example, a rotation of a gear wheel rolling on the toothed area can be damped.

In the case of a fixing system of the invention, it is conceivable further for the guide to have an electrical connector by which an electrical connection through the fixing opening can be realized, in particular wherein the guide has a switching element by means of which an electrical signal can be generated when the door moves. In addition or alternatively, the electrical connection can be closed and/or interrupted by the switching element when the door moves. A line can thus preferably be guided by the rotary element, so that an electrical connection can be ensured within the housing, in particular within the storage compartment. In particular, lighting of the storage compartment can be realized thereby and/or a switch, which, for example, is actuated when the storage compartment or the door is opened, for example. In particular, the guide can have a connection contact, by which an energy source and/or a consumer, for example, lighting of the storage compartment, can be connected to the electrical connector, in particular in order to connect it to the vehicle electrical system and/or to the consumer. The switching element can, for example, comprise a wedge-shaped stop which, when the rotary element moves relative to the rail element, enables an electrical connection of the electrical connector to a consumer, in particular within the storage compartment, in particular indirectly, e.g., by actuating a switch. In this way, for example, a light source for illuminating the storage compartment can be triggered automatically in the event of an opening movement of the door. In particular, depending on the movement of the door, the switching element can generate an electrical signal by which the position of the door can be detected and/or a consumer can be controlled. For this purpose, a control device can be provided which processes the signal. The switching element can also directly or indirectly effect the generation of the signal. The switching element can also be disposed, for example, in or on the rotary element and in particular itself comprise a switch, or the switching element can be used to actuate an additional switch and preferably be arranged on the rail element.

According to a further aspect of the invention, a method for producing a housing for a storage compartment of a vehicle is claimed. In particular, the housing is a housing of the invention. The housing further has a wall with a fixing opening for disposing a guide of a fixing system. In particular, the fixing system can be a fixing system of the invention. The method for producing the housing further comprises, for example: providing a mold with at least one first and second molding element which at least partially form a cavity which at least partially forms a negative shape of the vehicle part, wherein the first and second molding elements seal a contact area in which the fixing opening can be formed at least in part, in particular when the cavity is filled, filling the cavity with a material of the housing, and demolding the first and second molding elements, in particular so that the wall with the fixing opening can be removed from the mold.

The fixing opening can be formed automatically when the cavity is filled, i.e., in particular during the casting process. The first and second molding elements are preferably demolded along a main demolding direction, wherein the first molding element is preferably removed in a direction opposite to a demolding direction of the second molding element. In particular, the cavity can be completely filled during filling, preferably by means of a plastic injection molding process. The negative shape of the housing can therefore be understood to mean a shape that limits regions for a material flow when the cavity is filled, so that the material of the housing does not penetrate into these areas. In particular, in so doing, the cavity can be made larger than the housing to be produced if the material shrinks, for example, during cooling. The first and second molding elements can preferably contact one another and/or be sealed to one another in the region of the fixing opening to be produced. In particular, the contact region can thus also be referred to as a parting line. The fixing opening can thus arise, for example, in two directions from the contact of the molds. In particular, the first mold can comprise a region that abuts the first surface region. The second mold can comprise a region that abuts the second surface region, in particular wherein the first mold is in particular perpendicular to the second surface region to be produced. A method of the invention for producing a housing thus brings with it the same advantages as have been described in detail with reference to a housing of the invention and/or with reference to a fixing system of the invention. In particular, simple production of the housing is thus possible without the fixing opening having to be introduced subsequently or without a slide for the fixing opening being necessary. In order to at least partially realize the wall and the fixing opening, the first and second molding elements are therefore preferably sufficient.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
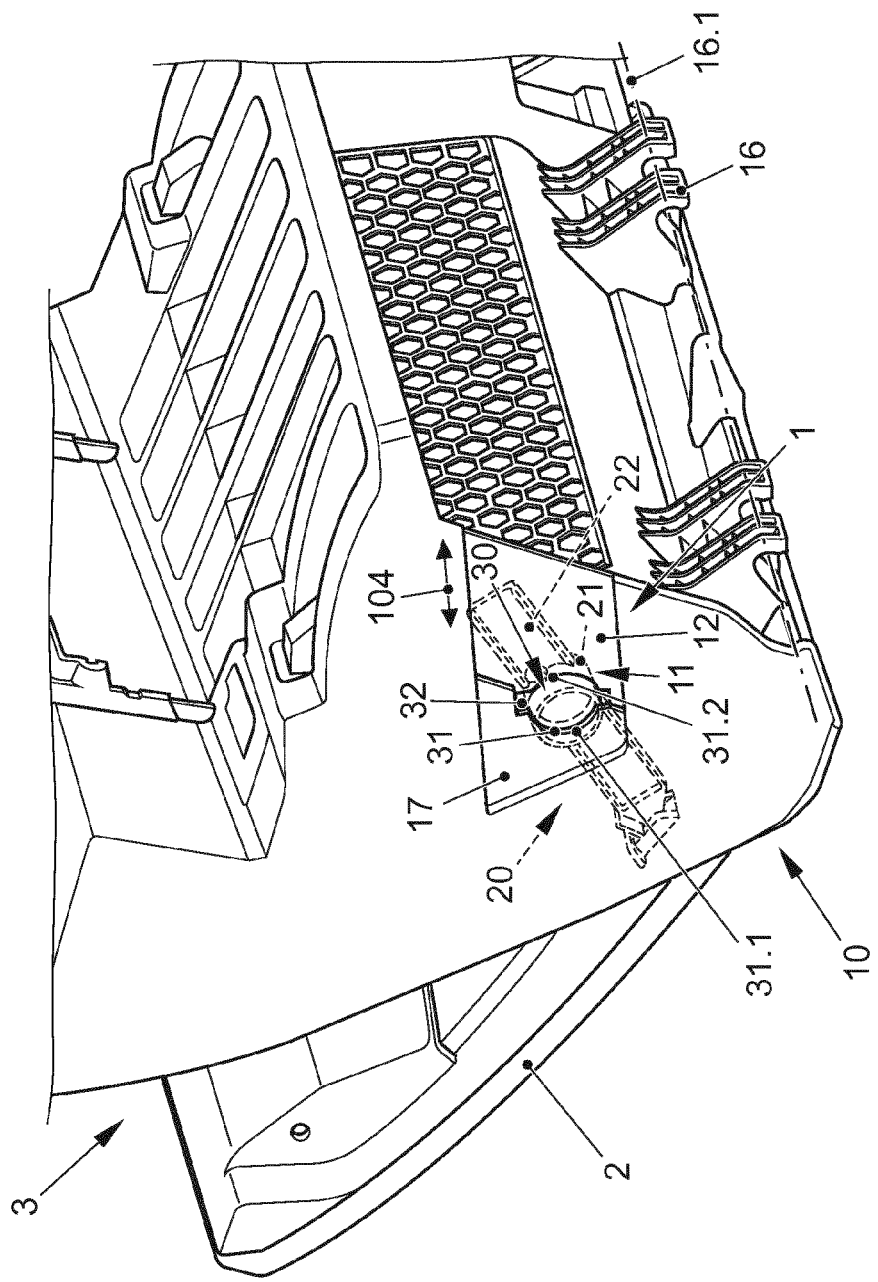
FIG. 1 shows a fixing system of the invention with a housing of the invention in a schematic perspective view in a first exemplary embodiment.

FIG. 1 shows a fixing system 1 of the invention in a first exemplary embodiment in a schematic view. Fixing system 1 in this case has a housing 10 for a storage compartment 3 of a vehicle 4. Here, a door 2 is mounted pivotally about a hinge axis 16.1 via a hinge 16. Further, door 2 is mounted on housing 10 in a translational and/or rotary manner via a guide 20 (shown by dashed lines in FIG. 1). Housing 10 here has a wall 11. In particular, wall 11 is designed as a plastic injection molded part. A fixing opening 30 is provided in wall 11 in order to fasten guide 20 to housing 10 and thus to guide door 2 on housing 10. Fixing opening 30 adjoins a first surface region 12 of wall 11. Further, fixing opening 30 has a lateral surface 31 which at least partially projects beyond first surface region 12. Lateral surface 31 thus forms an edge of fixing opening 30, wherein a first edge side 31.1 is offset from a second edge side 31.2 opposite first edge side 31.1. First surface region 12 here forms in particular at least one part of the surface of wall 11 which is offset from a further surface region 17 of the surface. In particular, lateral surface 31 partially or completely surrounds a passage of fixing opening 30. As a result, housing 10 can be demolded on two sides along a main demolding direction 104, wherein fixing opening 30 is formed at the same time. In the area of fixing opening 30, a mold 100 makes contact during the production of housing 10, so that a slide for forming fixing opening 30 is not necessary.

Figure 2A:
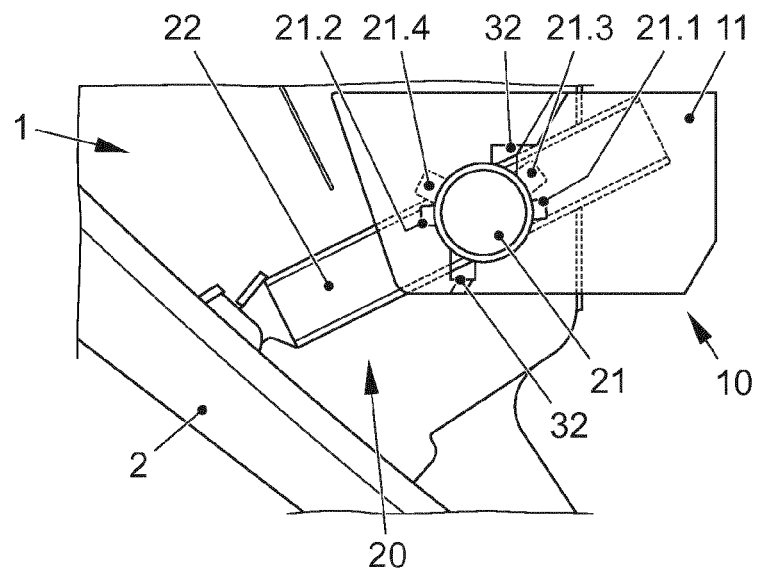
FIGS. 2a and 2b show detailed views of a guide of the fixing system of the invention according to the first exemplary embodiment.
Figure 2B:
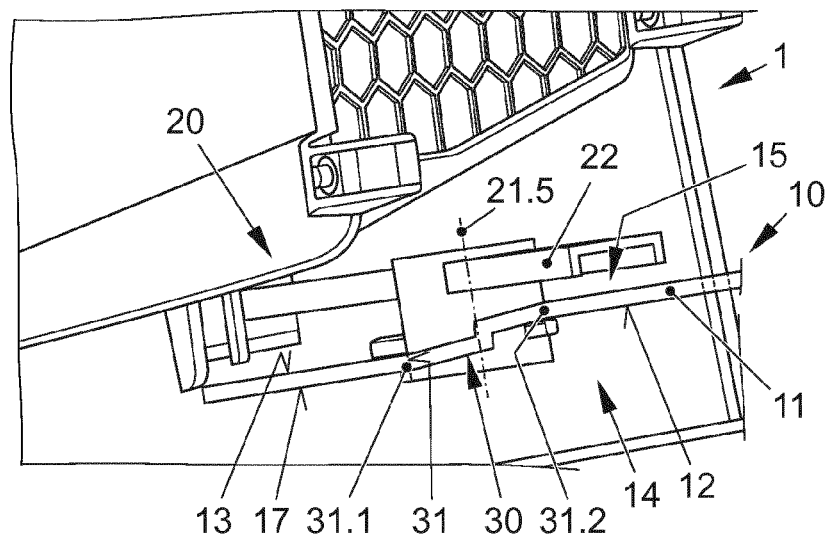

FIGS. 2a and 2b show fixing system 1 in further detail views of the first exemplary embodiment. Thus, FIG. 2a shows a side view of guide 20 on wall 11. Guide 20 has a rotary element 21 which is guided in fixing opening 30 at least in some areas in the manner of a slide bearing. For this purpose, rotary element 21 and fixing opening 30 are formed at least partially cylindrical. In addition or alternatively, rotary element 21 or fixing opening 30 can have a geometry that is not cylindrical but enables rotary element 21 to rotate. For example, rotary element 21 or fixing opening 30 can be formed elliptical. Further, fixing opening 30 has two mounting cutouts 32 through which a first and a second projection 21.1, 21.2 of rotary element 21 can be inserted during mounting. First projection 21.1 abuts first surface region 12 and second projection 21.2 abuts a first side 14 of wall 11 on the opposite side of fixing opening 30. In addition, rotary element 21 has a third and a fourth projection 21.3, 21.4, which form a positive fit corresponding to first and second projection 21.1, 21.2. As a result, play of rotary element 21 in fixing opening 30 can be reduced. To join door 2 of storage compartment 3, guide 20 further has a rail element 22 which is made U-shaped in order to be able to ensure a secure, in particular linear, guiding with rotary element 21. When door 2 is moved, rail element 22 moves relative to rotary element 21 in order to provide door 2 with the opening path. Further, rotary element 21 can rotate in fixing opening 30 in order to be able to ensure a pivoting movement of door 2.

FIG. 2b shows an axis of rotation 21.5 of rotary element 21 about which rotary element 21 rotates when door 2 is pivoted. Further, the structure of fixing opening 30 emerges again from FIG. 2. It is shown here that wall 11 has a first surface region 12 which at least partly forms a first side 14 of wall 11. Further, wall 11 has a second surface region 13, which at least partially forms a second side 15 of wall 11. First side 14 further comprises a further surface region 17, which is raised toward first surface region 12 and also adjoins fixing opening 30. The first and further surface regions 12, 17 can preferably merge into one another in a stepped or continuous manner, in particular next to fixing opening 30. First side 14 is in particular an outer side and second side 15 is an inner side of wall 11. Second surface region 13 is raised in relation to first surface region 12 in the direction of first side 14. Therefore, two molding elements 101, 102 of a mold 100 can meet or contact one another in the area of fixing opening 30, so that fixing opening 30 is created during demolding. In particular, first edge side 31.1 is raised in relation to second edge side 31.2. Alternatively, the first surface region and the second surface region 12, 13 can lie, for example, in one plane in order to be able to realize the demolding and the formation of fixing opening 30. First and second projections 21.1, 21.2 are also offset from one another in the direction of axis of rotation 21.5. This can ensure a positive fit on both edge sides 31.1, 31.2 and reduce the risk of rotary element 21 tipping over.

Figure 3:
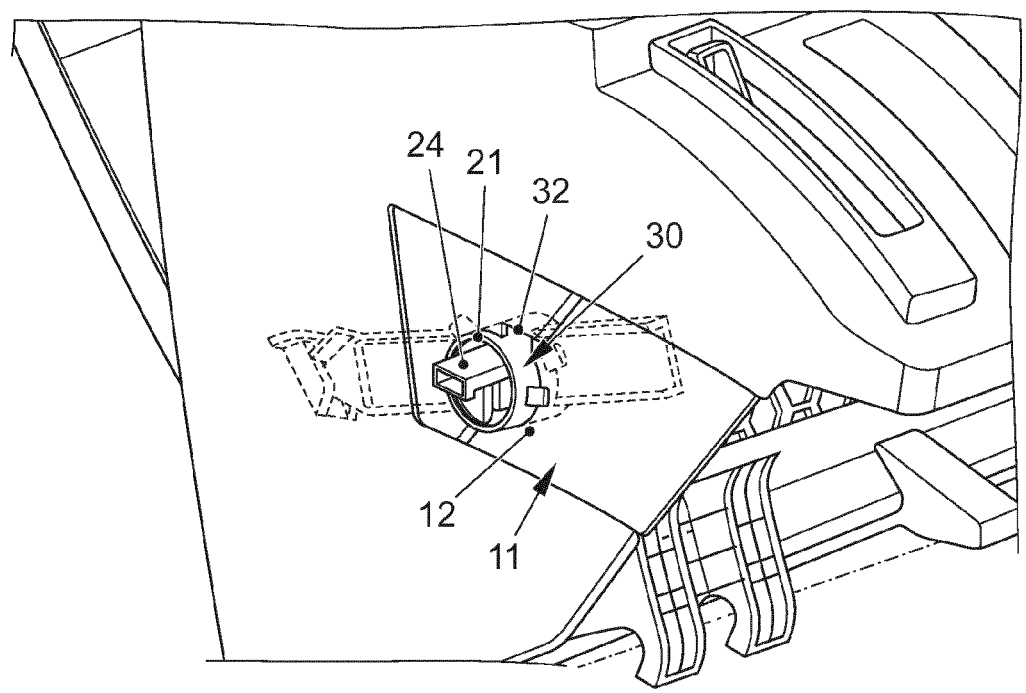
FIG. 3 shows the fixing system of the invention of the first exemplary embodiment with an electrical connector in a schematic view.

FIG. 3 also shows fixing system 1 with housing 10 of the first exemplary embodiment. However, an electrical connector 24 is provided in addition on rotary element 21. Electrical connector 24 passes at least partially through rotary element 21 and wall 11. For this purpose, electrical connector 24 has a connector plug. Guide 20, in particular rotary element 21, can preferably have a switch which opens and/or closes as a function of a relative movement between rotary element 21 and rail element 22.

Figure 4A:
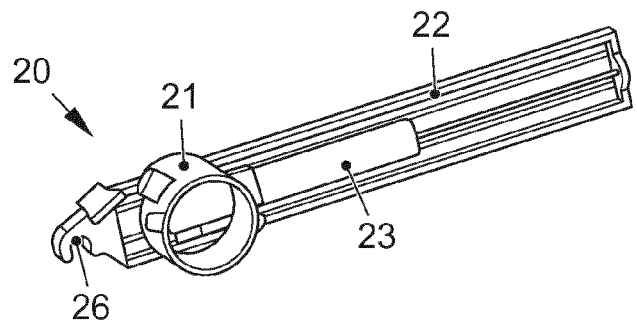
FIGS. 4a to 4c show possible exemplary embodiments of a guide for a fixing system of the invention in further exemplary embodiments.
Figure 4B:
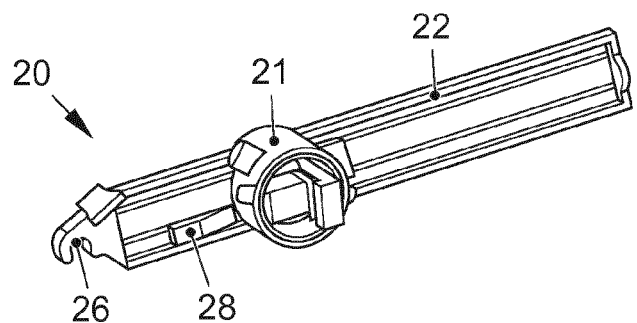
Figure 4C:
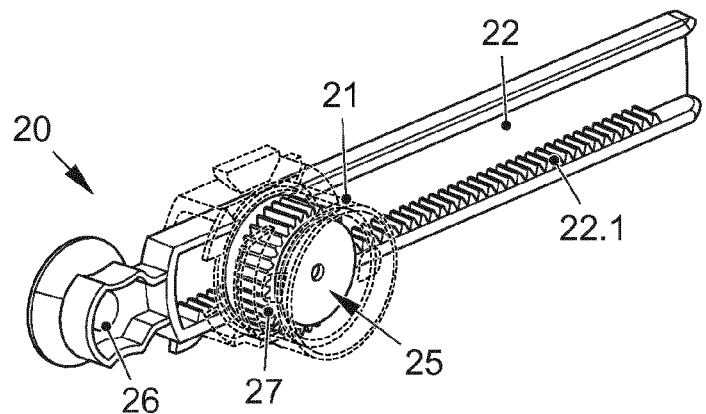

FIGS. 4a to 4c show possible embodiments of a guide 20. FIG. 4a shows a guide 20 with a rotary element 21 and a rail element 22. A damper element 23, which is designed as a pneumatic and/or hydraulic cylinder, is also disposed on rail element 22. As a result, a movement of rail element 22 relative to rotary element 21 can be damped or the movement can be stopped. In addition or as an alternative to damper element 23, a pneumatic and/or hydraulic cylinder can be provided, which effects a drive. A door 2 can thus be opened automatically and the opening movement can be initiated by the pneumatic and/or hydraulic cylinder. To connect rail element 22 to door 2, rail element 22 has a door bearing 26, which is designed for the rotational mounting of door 2. FIG. 4b shows a guide 20 with a rail element 22 and a rotary element 21. In this case, rail element 22 can move relative to rotary element 21, wherein a switching element 28 can cause a closing of an electrical contact as a function of the movement. The switching element can preferably comprise a switch cam and/or be wedge-shaped, so that a circuit is closed when rotary element 21 moves onto switching element 28. In particular, depending on the position of rotary element 21 relative to the switching element 28, a signal can be generated in order to thereby detect the position of door 2. In addition or alternatively, a mechanical, in particular wedge-shaped stop can be provided by means of which friction increases and movement is limited. FIG. 4c further shows a guide 20 with a rail element 22, which can move relative to a rotary element 21. In this regard, rotary element 21 has a drive element 25 which can cause a gear wheel 27 to roll on a rack element 22.1 of rail element 22. In particular, drive element 25 can comprise at least part of an electric motor. In addition or alternatively, rotary element 21 can comprise a damper element, which acts, for example, with the teeth of gear wheel 27 in order to exert the damping effect.

Figure 5A:
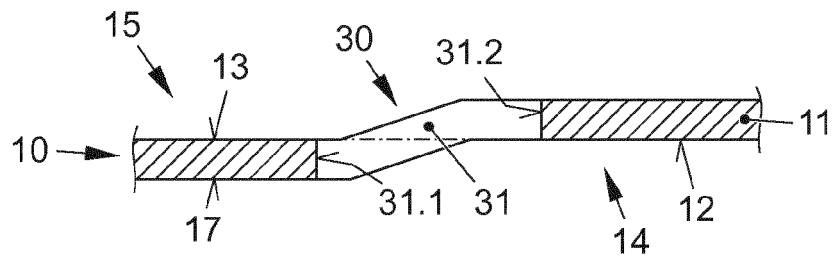
FIGS. 5a to 5c show sectional partial views of a housing of the invention in further exemplary embodiments.
Figure 5B:
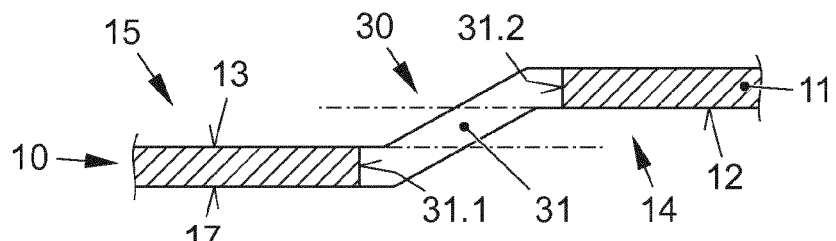
Figure 5C:
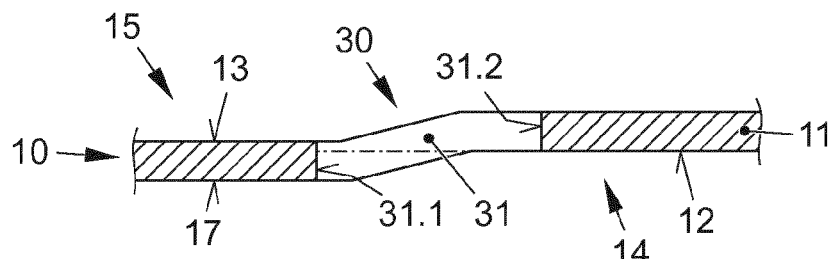

FIGS. 5a to 5c show further embodiments of a wall 11 of a housing 10 according to the invention in a schematic partial sectional view. Housing 10 has wall 11 with a first side 14 and a second side 15. First side 14 is at least partially formed by a first surface region 12 and second side 15 is at least partially formed by a second surface region 13. First and second surface region 12, 13 adjoin a fixing opening 30. Fixing opening 30 has a lateral surface 31 which projects at least partially, i.e., at least in a first edge region 31.1 of lateral surface 31, beyond first surface region 12. In particular, first edge region 31.1 of lateral surface 31 is offset from a second edge region 31.2 which adjoins first surface region 12, so that the first and second surface regions 12, 13 lie in one plane. As a result, in the region of fixing opening 30, during the production of wall 11, molding elements 101, 102 of a mold tool 100 can contact and be demolded accordingly. FIG. 5b shows the design of wall 11 according to FIG. 5a, wherein, however, first and second surface regions 12, 13 do not lie in one plane, but rather second surface region 13 is raised in relation to first surface region 12 in the direction of first side 14. This promotes demolding during the production of wall 11. FIG. 5c also shows a further embodiment of wall 11 or fixing opening 30 according to FIGS. 5a and 5b, wherein, however, fixing opening 30 is designed such that second surface region 13 lies with first surface region 12 substantially but not completely in one plane. With a small offset of first and second surface regions 12, 13, a forced demolding of molding elements 101, 102 of mold 100 is still possible hereby if they slightly engage in fixing opening 30. In particular, wall 11 can have a flexible material and/or fixing opening 30 can have a bevel in order to promote the forced demolding.

Figure 6:
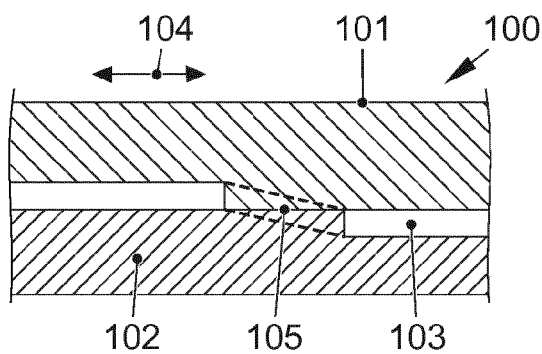
FIG. 6 shows a mold for executing a method of the invention in a further exemplary embodiment.

FIG. 6 shows a mold 100 for carrying out a production method of the invention with a main demolding direction 104. In this respect, a first molding element 101 and a second molding element 102 are provided, which at least partially form a negative shape of a wall 11 of housing 10 and preferably two halves of mold 100. Molding elements 101, 102 furthermore form a cavity 103 in which wall 11 of a housing 10 for a storage compartment 3 can be produced. For this purpose, cavity 103 can be filled, in particular filled totally, with a casting material for producing wall 11. However, in a contact area 105, i.e., an area of a fixing opening 30, to be produced, of wall 11, it is further provided that molding elements 101, 102 contact one another or are sealed from one another, so that no material penetrates into contact area 105 when cavity 103 is filled and consequently, when molding elements 101, 102 of mold tool 100 are demolded, fixing opening 30 is created automatically. Cavity 103 is thus interrupted in contact area 105. Cavity 103 has an offset on the opposite sides of contact area 105. This creates a lateral surface 31 of fixing opening 30 during the casting process, which at least partially projects beyond first surface region 12. In particular, a stepped edge region is provided, which surrounds contact area 105, so that cavity 103 is completely connected. Additional processing of wall 11 to produce fixing opening 30 may not be necessary thereby. The demolding of molding elements 101, 102 is carried out in particular by removing molding elements 101, 102 from one another along main demolding direction 104. This can preferably be carried out by moving only one of molding elements 101, 102. In particular, wall 11 can have a draft angle or extend obliquely in order to promote the demolding of molding elements 101, 102.

Figure 7:
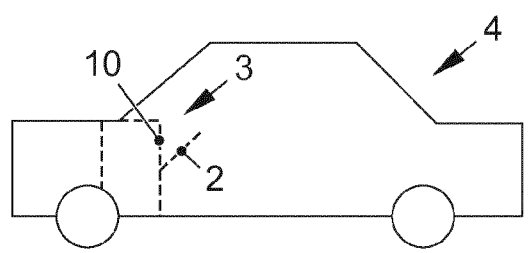
FIG. 7 shows a vehicle with a housing of the invention in a further exemplary embodiment.

FIG. 7 further shows a vehicle 4 with a housing 10 of the invention for a storage compartment 3, which can be opened via a door 2. In this regard, storage compartment 3 is designed as a glove compartment of vehicle 4. Housing 10 can preferably be designed in accordance with a housing of the preceding exemplary embodiments.

The above explanation of the embodiment describes the present invention solely in the context of examples. Of course, if technically reasonable, individual features of the embodiments can be freely combined with one another without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing for a storage compartment of a vehicle, the housing comprising:
   a wall having a first surface region, which at least partly forms a first side of the wall;
   a fixing opening that adjoins the first surface region; and
   a guide to guide an opening and/or closing movement of a door of the storage compartment, the guide being disposed in the fixing opening,
   wherein the fixing opening has a lateral surface that at least partially projects beyond the first surface region.

2. The housing according to claim 1, wherein a second surface region of a second side of the wall adjoins the fixing opening, wherein the second surface region lies at least substantially in a plane with the first surface region or is raised in relation to the first surface region in a direction of the first side.

3. The housing according to claim 1, wherein the lateral surface for the rotary guiding of the guide is formed at least partially cylindrical, or wherein the fixing opening has a mounting cutout through which at least one first projection of a rotary element of the guide is adapted to be inserted.

4. A fixing system for at least partially fixing a door of a storage compartment of a vehicle, the fixing system comprising:
   a guide to guide an opening and/or closing movement of the door; and
   a housing with a wall having a first surface region, which at least partly forms a first side of the wall, and the housing having a fixing opening that adjoins the first surface region,
   wherein the guide is disposed in the fixing opening, and
   wherein the fixing opening has a lateral surface that at least partially projects beyond the first surface region.

5. The fixing system according to claim 4, wherein the guide comprises a rotary element that projects through the fixing opening, or wherein a rail element, via which the door is adapted to be coupled in a translational and/or rotary manner, is guided in the rotary element.

6. The fixing system according to claim 5, wherein the rotary element has a first and a second projection, wherein the first and second projection for mounting the rotary element on the wall is inserted through a mounting cutout of the fixing opening so that the first and second projection abut the first side of the wall in the mounted state.

7. The fixing system according to claim 5, wherein the rotary element has a third and a fourth projection, and wherein the third and fourth projection abut a second side of the wall.

8. The fixing system according to claim 4, wherein the guide has a damper element via which a relative movement of the rail element to the rotary element is damped and/or wherein the guide has a drive element via which a relative movement of the rail element to the rotary element is initiated.

9. The fixing system according to claim 4, wherein the guide has an electrical connector via which an electrical connection through the fixing opening is realized, or wherein the guide has a switching element via which an electrical signal is generated when the door moves and/or the electrical connection is closed and/or interrupted.

10. A method for producing a housing for a storage compartment of a vehicle, the housing comprising a wall having a first surface region, which at least partly forms a first side of the wall, and the housing having a fixing opening that adjoins the first surface region, the fixing opening for disposing a guide of a fixing system, the guide provided to guide an opening and/or closing movement of a door of the storage compartment and the fixing opening having a lateral surface that at least partially projects beyond the first surface region, the method comprising:
    providing a mold with at least one first and second molding element which at least partially form a cavity which at least partially forms a negative shape of the housing, wherein the first and second molding elements seal a contact area in which the fixing opening, in which the guide will be disposed, is formed at least in part;
    filling the cavity with a material of the housing; and
    demolding the first and second molding elements.

* * * * *